F. H. ARMSTRONG.
TYPEWRITING MACHINE.
APPLICATION FILED JUNE 7, 1919.
1,437,214.
Patented Nov. 28, 1922.
3 SHEETS—SHEET 2.
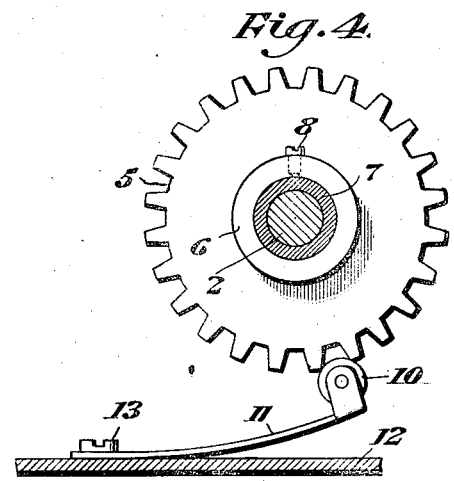
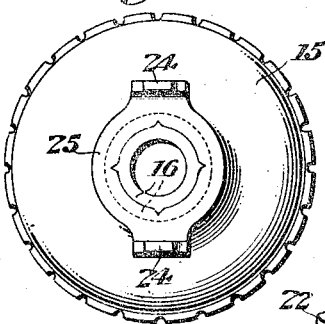
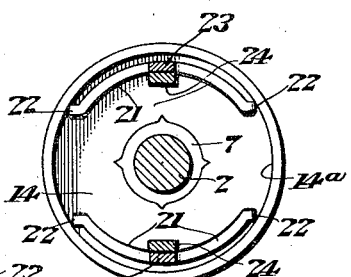
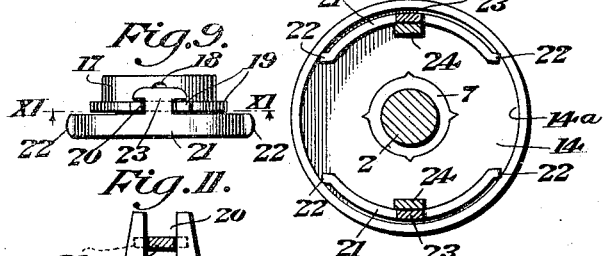
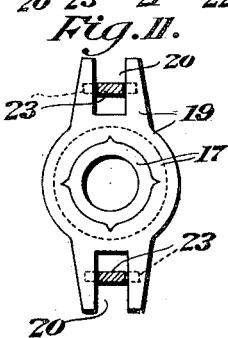
Inventor,
Frank H. Armstrong,
By his Attorneys
Criswell & Davis

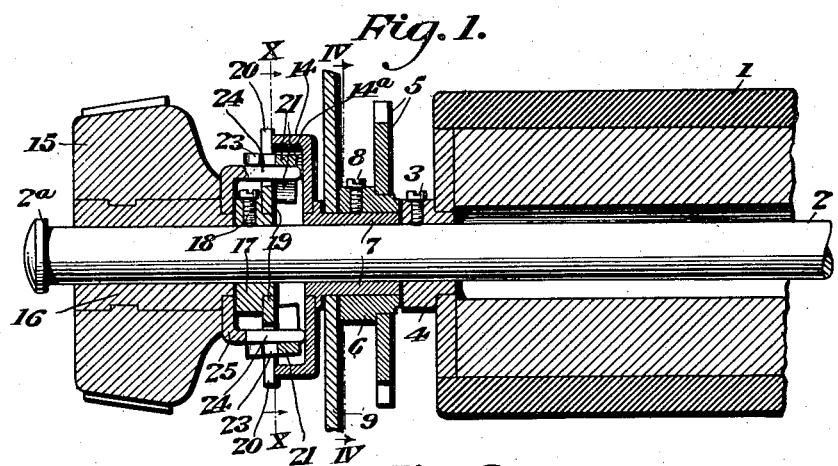
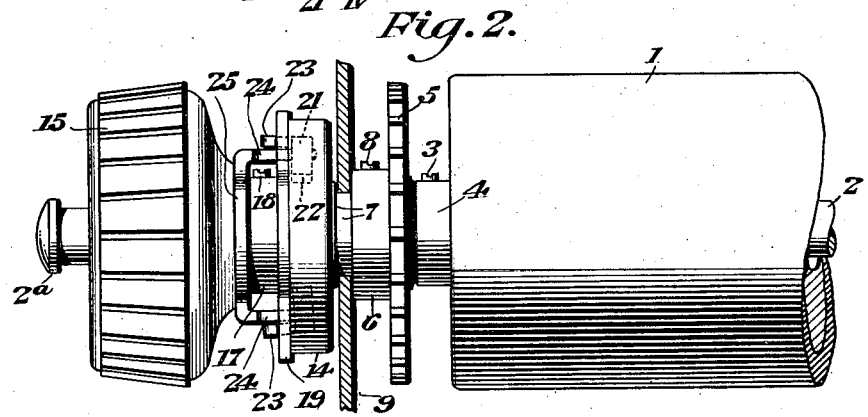
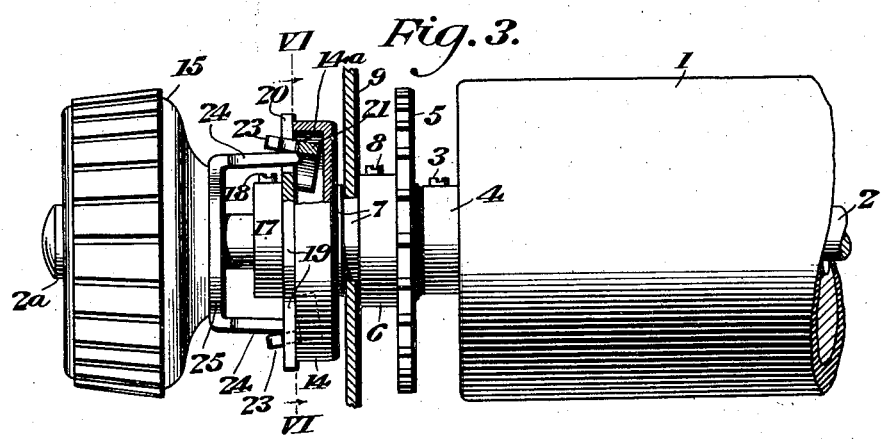

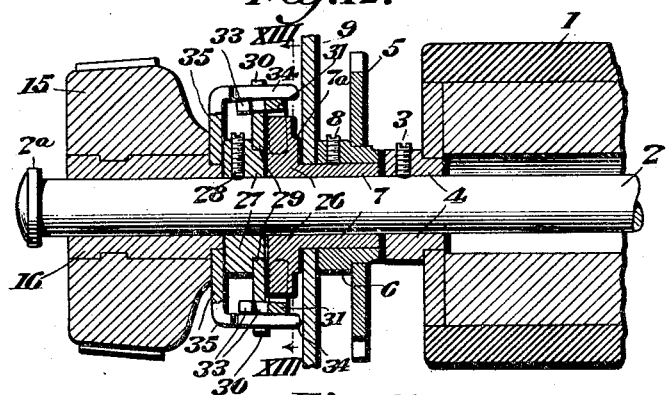
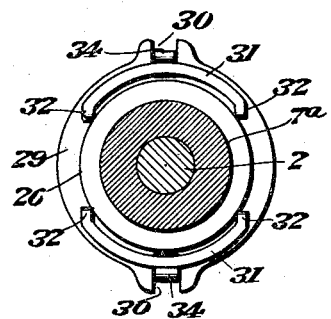
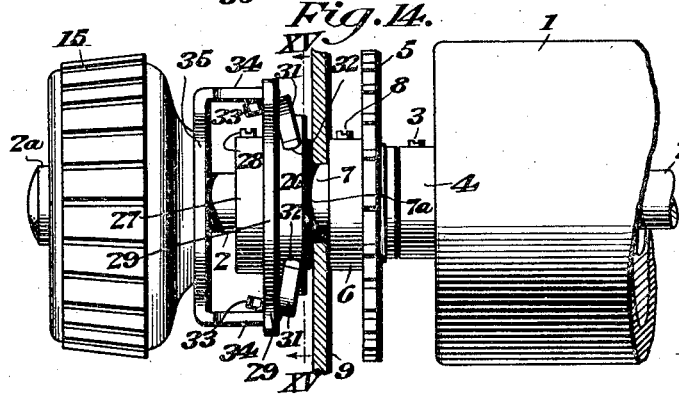
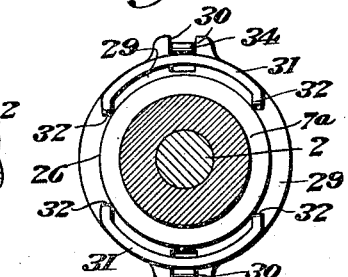
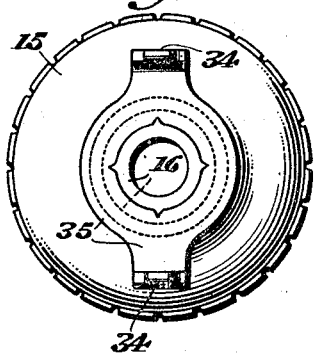
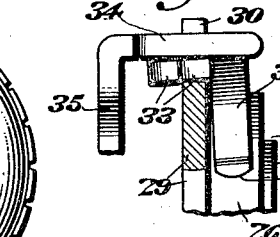
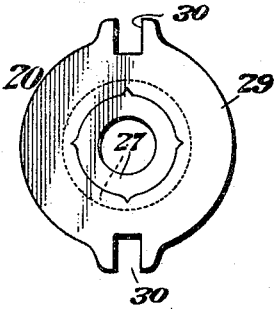
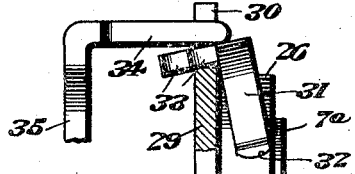

Patented Nov. 28, 1922.

1,437,214

UNITED STATES PATENT OFFICE.

FRANK H. ARMSTRONG, OF AUBURN, NEW YORK, ASSIGNOR TO CORONA TYPEWRITER COMPANY, INC., OF GROTON, NEW YORK, A CORPORATION OF NEW YORK.

TYPEWRITING MACHINE.

Application filed June 7, 1919. Serial No. 302,519.

*To all whom it may concern:*

Be it known that I, FRANK H. ARMSTRONG, a citizen of the United States, and a resident of Auburn, county of Cayuga, and State of New York, have invented certain new and useful Improvements in Typewriting Machines, of which the following is a specification.

This invention relates to improvements in typewriting machines, and more particularly to improvements in line-spacing mechanism of the type in which the platen and the line space wheel may be disconnected at will to permit rotation of the platen independently of the line space wheel in either direction for irregular line spacing.

The invention has for one of its objects the provision of simple and compact mechanism located wholly exteriorly of the platen roll for connecting and disconnecting the platen and line space wheel.

A further important object of the invention is to provide a gripping device and supporting and actuating means therefor so constructed that said device will automatically adjust itself when forced into engagement with a cooperating gripping surface to compensate for inequalities in the parts and insure a firm engagement of the device with said surface.

Another object of the invention is to provide a simple, compact, durable, and efficient friction clutch mechanism constructed of sheet metal for connecting and disconnecting a platen and line space wheel and comprising a minimum number of parts.

An important feature of the invention consists in the provision of a resilient gripping device adapted to engage a circular friction surface at two circumferentially spaced points and resilient means engaging said device and shiftable transversely thereof to move the device at an angle to the axis of the friction surface into and out of engagement with said surface.

The invention further consists in the provision of a clutch member rotatable with the line space wheel and having a friction surface concentric with the axis of the platen, a pair of gripping devices connected with a driver rotatable with the platen to move inwardly and outwardly toward and from the axis of the platen, and an axially slidable finger wheel carrying arms which engage and shift the gripping devices and also hold said devices and finger wheel in their adjusted positions, said arms having a sliding connection with the driver at all times to permit rotation of the platen by the finger wheel in either of the endwise adjusted positions of the wheel.

A further highly advantageous feature of the present invention consists in the provision of a shiftable clutch element having a universal rocking connection with a driver.

In the drawings, Fig. 1 is a vertical longitudinal sectional view showing one form of platen and line space wheel connecting means, the parts being shown in position for connecting the platen and wheel to rotate in unison;

Fig. 2 a front elevation of the mechanism as shown in Fig. 1;

Fig. 3 a view similar to Fig. 2, the parts being shown in position for disconnecting the platen and line space wheel;

Fig. 4, a transverse section on the line IV—IV of Fig. 1;

Fig. 5 an end elevation of the finger wheel and the gripper actuating means carried thereby;

Fig. 6 a transverse section on the line VI—VI of Fig. 3;

Fig. 7 a perspective view of one of the gripping devices;

Fig. 8 a detail plan view of the gripping device actuating means carried by the finger wheel;

Fig. 9 a plan view of the gripping devices and the guiding and driving means therefor;

Fig. 10 a transverse section on the line X—X of Fig. 1;

Fig. 11 a transverse section on the line XI—XI of Fig. 9;

Fig. 12 a view similar to Fig. 1 showing a modified construction;

Fig. 13 a transverse section on the line XIII—XIII of Fig. 12;

Fig. 14 a front elevation of the mechanism shown in Fig. 12, showing the parts in position for disconnecting the platen and line space wheel;

Fig. 15 a transverse section on the line XV—XV of Fig. 14;

Fig. 16 a view similar to Fig. 9 showing the modified form of gripping device and guiding and driving means therefor employed in the construction shown in Fig. 12;

Fig. 17 an end elevation of the finger wheel and gripper operating means employed in the modified construction;

Figs. 18 and 19 detail views illustrating the gripping and releasing operations respectively of the gripping devices employed in the modified construction; and Fig. 20 an end elevation of the gripper guiding and driving means employed in the modified construction.

In the construction shown in Figs. 1 to 11, inclusive, 1 designates a platen roll fixed to the platen shaft 2 by set screws 3 tapped through sleeves 4 held to the opposite ends of the platen roll. A line space wheel 5, preferably stamped from sheet metal, is fixed on a hub 6 locked on a sleeve 7 by a set screw 8. The sleeve 7 is loosely mounted on the platen shaft 2 and is journalled in an aperture in the adjacent end bracket 9 of a suitable platen carriage, the platen shaft being journalled adjacent its opposite end in the usual manner in the opposite end bracket of the carriage. The line space wheel is yieldably held against rotation by a detent roller 10 journalled in the free end of a resilient arm or curved spring 11 the other end of which is secured to the base plate 12 of the platen carriage by a screw 13. Any suitable form of platen carriage may be employed, such for example as that shown in my co-pending application Serial No. 196,867, filed October 16, 1917. Any suitable line spacing mechanism may be employed for rotating the ratchet wheel 5 step by step for regular line spacing, such for example as the mechanism shown in my co-pending application Serial No. 256,684, filed October 3, 1918, or my copending application Serial No. 256,685, filed October 3, 1918.

A cup-shaped friction disk or drum 14, preferably formed of sheet metal, having an internal annular friction surface 14$^a$ is fixed on the outer end of sleeve 7 exteriorly of the end bracket 9. Sleeve 7 is preferably formed with an external flange or collar abutting against the outer face of bracket 9 and the outer end of hub 6 preferably abuts against the inner face of said bracket, while the inner ends of hub 6 and sleeve 7 abut against the outer end of sleeve 4, thus holding the disk 14 and the ratchet wheel 5 against movement longitudinally of the platen shaft.

A finger wheel 15 is fixed on a sleeve 16 loosely mounted on the platen shaft and shiftable longitudinally of the shaft, the platen shaft being formed at its end with a collar or flange 2$^a$ for limiting the outward movement of the finger wheel. A collar or hub 17 is fixed on the platen shaft adjacent the outer edge of the cup-shaped disk 14 by a set screw 18. A sheet metal guiding and driving member or plate 19 is fixed on the collar 17, said member being formed with two diametrically opposed open ended slots 20 extending radially of the axis of the platen shaft 2. A pair of oppositely disposed arcuate gripping members or devices 21 are housed within the cup-shaped disk or drum 14, each of said members having outwardly bent rounded end portions 22 forming jaws adapted to grip the internal friction surface 14$^a$ of said disk 14. The gripping devices 21 are preferably formed of slightly resilient sheet metal, and each of said devices is formed midway its ends with a laterally extending T-shaped lug or tail piece 23 the reduced shank portion of which is slidably held in one of the radial slots 20 in the guide plate 19. The guide plate 19 and lugs 23 form a constant driving connection between the platen shaft and the gripping devices, while said slots 20 and the T-lugs 23 permit a radial sliding movement of the gripping devices and also a universal rocking or tilting movement of the devices relatively to the guide plate 19 and the friction surface 14$^a$ on disk 14.

The two oppositely disposed gripping devices 21 are adapted to be forced outwardly by a pair of resilient arms 24 formed integrally with a plate 25, the U-shaped gripper actuating member thus formed being preferably stamped from sheet metal. The plate 25 is rigidly held to the inner end of sleeve 16 and abuts against the inner face of finger wheel 15. The resilient arms 24 extend inwardly longitudinally of the platen shaft and normally diverge slightly, as shown, the free inner ends of said arms being preferably slightly rounded and engaging under the gripping devices 21 midway the ends of said devices. The arms 24 extend through the radial slots 20 in plate 19 in all positions of the finger wheel 15 and have a sliding movement relatively to said plate for actuating the gripping devices 21. The arms 24 and plate 19 thus form a constant driving connection between the finger wheel and platen shaft, so that the platen may be rotated by the finger wheel in all positions of the wheel. The T-lugs 23 not only serve to guide the gripping devices in slots 20 and to permit a universal rocking movement thereof, but also prevent undue movement of said devices longitudinally of the platen. The arms 24 and the friction surface of disk 14 limit the radial movement of the gripping devices.

When the parts are in the position shown in Fig. 3, the pressure of arms 24 on the gripping devices is relieved and said devices are free to move inwardly slightly toward the platen shaft and also to rock or tilt toward the inner face of plate 19 away from the annular friction surface 14$^a$ on disk 14, thus disconnecting the line space wheel and platen and permitting free rotation of the platen in either direction independently of the line space wheel through the medium of finger wheel 15. When it is desired to connect the line space wheel and platen so that the platen may be rotated step by step for regular line-spacing through the medium of the line space wheel and a suitable line space lever and pawl, the finger wheel is moved inwardly upon the platen shaft as shown in Figs. 1 and 2. The diverging resilient arms 24 are thus forced inwardly between the opposed gripping devices, forcing said devices outwardly and causing the jaws 22 thereon to firmly grip the surface 14ª on disk 14 at four space points. During this inward movement of arms 24 said arms will yield slightly and the resilient arcuate gripping devices will also be slightly bowed, thus holding the jaws in gripping relation under spring pressure. This arrangement not only affords a highly efficient grip but also serves to hold the finger wheel against accidental outward movement while permitting said wheel to be readily pulled outwardly when it is desired to release the line space wheel. The universal rocking connection of the grippers 21 with plate 19 and the sliding engagement of the arms 24 with said devices coincident with said connection and midway between the jaws 22, permits the grippers to automatically adjust themselves to compensate for inequalities in the parts and insures an even pressure of the jaws against surface 14ª. This automatic adjustment is facilitated by rounding of the gripping faces of the jaws as shown so that the grippers will readily rock about said rounded jaws as the arms 24 are forced inwardly until the lugs 23 lie flush or substantially flush with the arms 24.

In the construction shown in Figs. 12 to 20, inclusive, the friction disk, gripping devices, and the gripping device actuating means are slightly modified, the gripping devices being movable inwardly to lock the platen and line space wheel for rotation in unison, instead of being movable outwardly for this purpose. In this construction the sleeve 7 is formed with an integral friction disk or drum 26 on its outer end having an external friction surface, the inner face of said disk being preferably provided with a shoulder 7ª adjacent the outer face of bracket 9 cooperating with hub 6 for preventing movement of the friction disk and line space wheel longitudinally of the platen shaft 2.

A collar or hub 27 is fixed on the platen shaft adjacent the outer face of disk 26 by a set screw 28, and a plate 29 is fixed on said collar. The plate 29 is preferably formed of sheet metal and is provided with two diametrically opposed open ended slots 30 extending radially of the axis of rotation of the platen shaft 2. A pair of oppositely disposed arcuate gripping devices 31, formed of slightly resilient sheet metal and having inwardly bent rounded end portions forming jaws 32, are adapted to grip the periphery of disk 26. Each gripping device 31 is formed midway its ends with a laterally extended T-shaped lug 33, the reduced shank portion of which is slidably confined in one of the slots 30 in plate 29. The T-lugs 33 and plate 29 form a driving connection between the platen shaft and the gripping devices and said T-lugs also form radial sliding connections and universal rocking connections between the gripping devices and plate 29. The gripping devices 31 are actuated by a pair of resilient arms 34 preferably formed integrally with a sheet metal plate 35 rigidly held to the inner end of sleeve 16 and abutting against the inner face of finger wheel 15. The resilient arms 34 and plate 35 form a substantially U-shaped actuating member movable longitudinally of the platen shaft with finger wheel 15. The arms 34 preferably converge slightly toward their free inner ends and extend through slots 30 in all positions of the finger wheel.

The arms 34 engage the outer sides of gripping devices 31 midway the ends of said devices and the free ends of said arms are preferably rounded as shown.

When the parts are in the position shown in Figs. 14, 15 and 19, the pressure of the arms 34 on gripping devices 31 is relieved and said devices are free to move slightly outwardly radially of the axis of the platen shaft and also to rock away from the inner face of plate 19 and the periphery of the friction disk 26, thus disconnecting the platen and line space wheel and permitting free rotation of the platen in either direction by means of the finger wheel. When the finger wheel is forced inwardly along the platen shaft the free ends of arms 34 will move inwardly across the outer sides of gripping devices 31 and force said devices inwardly toward the platen shaft to cause jaws 32 to firmly grip the periphery of disk 26 at four spaced points. During the inward movement of the finger wheel the resilient arms 34 will be spread apart slightly and the resilient gripping devices will also be slightly compressed thus holding the jaws 32 in engagement with disk 26 under spring pressure. The gripping devices 31 are free to rock as well as yield, thus permitting the devices to automatically adjust themselves to compensate for inequalities in the parts and insuring an even pressure of the jaws upon the disk. The yielding of arms 34 also serves to provide a firm frictional contact of said arms with the gripping devices for holding the finger wheel in its inner position. The T-lugs serve to guide the gripping devices during the inward and outward movement thereof and to prevent undue movement of the devices longitudinally of the platen. The gripping devices are held in the slots 30 in plate 29 by the arms 34, said devices being confined between the arms 34 and the periphery of friction disk 26.

What I claim is:

1. In a typewriting machine, the combination of a platen shaft, a platen roll fixed on the shaft, a line space wheel loose on the shaft, a sheet metal drum loose on the shaft and connected with the line space wheel to rotate therewith, a sheet metal driver plate fixed on the shaft adjacent said drum and provided with slots, sheet metal gripping devices within the drum each provided with a laterally extending lug engaged in one of the slots in the driver plate, a finger wheel slidable axially on the platen shaft, and a sheet metal spreader held to said finger wheel and engaging the inner sides of the gripping devices.

2. In a typewriting machine, the combination of a platen shaft, a line space wheel loose on the shaft, a sheet metal drum loose on the shaft and connected with the line space wheel to rotate therewith, a sheet metal driver plate fixed on the shaft adjacent said drum and provided with slots, sheet metal gripping devices within the drum each adapted to engage the annulus of the drum at a plurality of points spaced apart around the drum and each having a headed laterally extending lug engaged in one of the slots of the driver plate, a finger wheel slidable axially on the platen shaft, and a sheet metal member held to the finger wheel and provided with arms extending inwardly through the slots in the driver plate and slidably engaging the inner sides of the gripping devices.

3. In a typewriting machine, the combination with a platen carriage having end memmbers for supporting a platen, a platen shaft journalled in the end members of the carriage, a platen roll fixed on the shaft between the end members of the carriage, a sleeve loose on the shaft and extending through one of the end members of the carriage, a line space wheel fixed on said sleeve between the adjacent end of the platen and the end member, a drum fixed on said sleeve at the outer side of the end member, a driver fixed on the platen shaft adjacent the outer face of the drum, gripping devices shiftably held to the driver to rotate in unison therewith and adapted to be shifted relatively thereto to grip the drum at points spaced apart around the drum and within the planes of the side edges of the drum, a finger wheel slidable axially on the shaft at the outer side of the driver, and means held to the finger wheel for actuating the gripping devices.

4. In a typewriting machine, the combination of a platen shaft, a platen roll fixed on said shaft, a line space wheel loose on the shaft, a clutch member held to rotate with the wheel, a cooperating shiftable clutch member, a finger wheel loosely mounted on the shaft and shiftable axially thereon, a resilient member carried by the finger wheel for moving the shiftable clutch member into driving relation with the other clutch member, and a driver held to the platen shaft and having a constant driving connection with said resilient member and the shiftable clutch member.

5. In a typewriting machine, the combination of a platen shaft, a platen roll fixed on the shaft, a line space wheel loose on the shaft, means forming a gripping surface at an angle to the face of the wheel rotatable with the wheel and encircling the axis thereof, a gripping device rotatable with the shaft and shiftable toward and from the same; and a finger wheel having a driving connection with the shaft and slidable axially thereon and operatively connected with the gripping device to force the device into gripping relation with said surface under spring pressure.

6. In a typewriting machine, the combination of a platen shaft, a platen roll fixed on the shaft, a line space wheel loose on the shaft, a drum rotatable with the wheel having a circular friction surface between its ends, an arcuate resilient metallic gripping device extending partly around the shaft having end portions bent to form jaws for gripping the friction surface of the drum at points spaced apart around the drum, means connecting said device to rotate with the shaft, and means rotatable with the shaft for shifting said device radially of the drum into and out of gripping relation with the friction surface of the drum.

7. In a typewriting machine, the combination of a platen shaft, a platen roll fixed on the shaft, a line space wheel loose on the shaft, means rotatable with the wheel forming a friction surface curved continuously around the shaft, an arcuate resilient metallic gripping device partially encircling the shaft and having its opposite ends bent to form jaws adapted to be forced against said curved friction surface at points spaced apart around said surface, means connecting the device to rotate with the shaft, and means rotatable with the shaft and shiftable relatively thereto longitudinally of the shaft and cooperating with said device to shift the same angularly relatively to the shaft into and out of gripping relation with said surface.

8. In a typewriting machine, the combination of a platen shaft, a platen roll fixed on the shaft, a line space wheel loose on the shaft, means rotatable with the wheel forming a continuous curved gripping surface encircling the shaft, a gripping device rotatable with the shaft and movable toward and from the same into and out of gripping relation with said curved surface, a resilient member rotatable with the shaft and shiftable endwise relatively thereto longitudinally of the shaft, and a handle movable longitudinally of the shaft supporting said member at one end, the other end of said member being free and adapted to force the gripping device against the gripping surface under spring pressure when the handle is moved in one direction.

9. In a typewriting machine, the combination of a platen shaft, a platen roll fixed on said shaft, a line space wheel loosely mounted on the shaft, a friction disk rotatable with said wheel, an arcuate resilient gripping device having end portions bent to form jaws adapted to grip said disk at points spaced radially of the axis of the disk, a member held to said shaft and provided with a radially extending slot in which said device is guided midway its ends, a finger wheel mounted on the shaft and shiftable longitudinally thereof, and an arm carried by said finger wheel and extending through said slot in engagement with said device for shifting said device transversely of the axis of the shaft.

10. In a typewriting machine, the combination of a platen roll, a line space wheel, means rotatable with the line space wheel forming a circular friction drum, a pair of diametrically opposed resilient sheet metal gripping devices rotatable with the platen roll and each having a pair of jaws adapted to be forced against the adjacent curved friction surface on the drum at points spaced apart around the drum, and means for shifting said devices toward and from each other.

11. In a typewriting machine, the combination of a platen roll, a line space wheel, means rotatable with the line space wheel forming a circular friction drum, a pair of diametrically opposed resilient sheet metal gripping devices rotatable with the platen roll and each having a pair of jaws adapted to be forced against the adjacent curved friction surface on the drum at points spaced apart around the drum, and resilient means shiftable longitudinally of the platen roll having a sliding frictional engagement with said devices at the opposite side thereof from the friction surface of the drum.

12. In a typewriting machine, the combination of a platen shaft, a platen roll fixed on the shaft, a line space wheel loose on the shaft, a sheet metal disk held to rotate with said wheel and having an annular flange, a sheet metal plate-like driver fixed on the shaft, a pair of shiftable diametrically opposed sheet metal gripping devices rotatable by the driver each having its opposite ends bent to form jaws adapted to grip the inner curved surface of the flange at points spaced apart around the flange, a finger wheel slidable on the shaft, and a pair of resilient sheet metal arms fixed to the finger wheel at their outer ends and having their free inner ends extending between the gripping devices and each slidably engaging one of said devices.

13. In a typewriting machine, the combination of a platen shaft, a platen roll fixed thereon, a line space wheel loosely mounted on the shaft, a friction disk held to rotate with said wheel and having a gripping surface concentric with the shaft, a pair of oppositely disposed gripping devices rotatable with the shaft having jaws adapted to grip said surface at radially spaced points, a finger wheel slidable longitudinally of the platen shaft and rotatable with the gripping devices, and a pair of oppositely disposed arms extending longitudinally of the platen shaft carried by the finger wheel having a sliding engagement with the gripping devices for forcing the jaws on said devices into gripping relation with the gripping surface of said disk.

14. In a typewriting machine, the combination of a platen shaft, a platen roll fixed thereon, a line space wheel loosely mounted on the shaft, a friction disk held to rotate with said wheel and having a gripping surface concentric with the shaft, a pair of oppositely disposed gripping devices rotatable with the shaft having jaws adapted to grip said surface at radially spaced points, a finger wheel slidable longitudinally of the platen shaft and rotatable with the gripping devices, and a pair of oppositely disposed resilient arms extending longitudinally of the platen shaft and carried by the finger wheel, said arms slidably engaging said gripping devices for moving the same transversely of the axis of the platen shaft.

15. In a typewriting machine, the combination of a platen shaft, a platen roll fixed thereon, a line space wheel loosely mounted on the shaft, a friction disk held to rotate with said wheel, a pair of oppositely disposed arcuate resilient gripping devices carrying jaws at their ends adapted to grip said disk at radially spaced points, a finger wheel slidable longitudinally of the platen shaft, said gripping devices and finger wheel being held to rotate with the shaft, and a pair of oppositely disposed arms carried by said finger wheel slidably engaging said devices for shifting the same transversely of the axis of the shaft.

16. In a typewriting machine, the combination of a platen shaft, a platen roll fixed thereon, a line space wheel loosely mounted on the shaft, a friction disk held to rotate with said wheel, a pair of oppositely disposed arcuate resilient gripping devices carrying jaws at their ends adapted to grip said disk at radially spaced points, a finger wheel slidable longitudinally of the platen shaft, said devices and finger wheel being held to rotate with the shaft, and means carried by the finger wheel for shifting the devices simultaneously transversely of the axis of the shaft.

17. In a typewriting machine, the combination of a platen shaft, a platen roll fixed thereon, a line space wheel loosely mounted on the shaft, a friction disk held to rotate with said wheel, a pair of oppositely disposed arcuate resilient gripping devices carrying jaws at their ends adapted to grip said disk at radially spaced points, a finger wheel slidable longitudinally of the platen shaft, said devices and finger wheel being held to rotate with the shaft, and a pair of oppositely disposed arms carried by the finger wheel extending longitudinally of the shaft at an angle thereto and slidably engaging the gripping devices for shifting the gripping devices into gripping relation with the friction disk.

18. In a typewriting machine, the combination of a platen shaft, a platen roll fixed thereon, a line space wheel loosely mounted on the shaft, a friction disk held to rotate with said wheel, a pair of oppositely disposed arcuate resilient gripping devices carrying jaws at their ends adapted to grip said disk at radially spaced points, a finger wheel slidable longitudinally of the platen shaft, said devices and finger wheel being held to rotate with the shaft, and a pair of oppositely disposed resilient arms carried by the finger wheel normally inclined at an angle to the shaft slidably engaging the gripping devices.

19. In a typewriting machine, the combination of a platen shaft, a platen roll fixed thereon, a line space wheel loosely mounted on the shaft, a friction disk held to rotate with said wheel, a pair of oppositely disposed arcuate resilient gripping devices carrying jaws at their ends adapted to grip said disk at radially spaced points, a finger wheel slidable longitudinally of the platen shaft, a pair of oppositely disposed resilient arms carried by the finger wheel extending longitudinally of the platen shaft and slidably engaging the gripping devices, and means held to the shaft for guiding said arms and gripping devices and forming a constant driving connection between the platen shaft and said arms and devices.

20. In a typewriting machine, the combination of a platen shaft, a platen roll fixed thereon, a line space wheel loosely mounted on the shaft, a friction disk held to rotate with the line space wheel, a guiding and driving member held to the shaft having two oppositely disposed radial slots therein, a pair of gripping devices guided in said slots and adapted to grip said disk, a finger wheel shiftable longitudinally of the shaft, and means carried by said finger wheel slidably engaging said devices for shifting the same radially of the platen shaft.

21. In a typewriting machine, the combination of a platen shaft, a platen roll fixed thereon, a line space wheel loosely mounted on the shaft, a friction disk held to rotate with the line space wheel, a guiding and driving member held to the shaft having two oppositely disposed radial slots therein, a pair of gripping devices each having a pair of jaws adapted to grip said disk at radially spaced points and also each having a part midway its ends slidably held in one of said slots, a finger wheel shiftable longitudinally of the shaft, and means carried by said finger wheel having a sliding connection at all times with said member and slidably engaging the gripping devices midway the ends of said devices.

22. In a typewriting machine, the combination of a platen shaft, a platen roll fixed thereon, a line space wheel loosely mounted on the shaft, a friction disk held to rotate with the line space wheel, a guiding and driving member held to the shaft having two oppositely disposed radial slots therein, a pair of gripping devices each having a pair of jaws adapted to grip said disk at radially spaced points and also each having a part midway its ends slidably held in one of said slots, a finger wheel shiftable longitudinally of the shaft, and a pair of arms carried by the finger wheel extending through the slots in said member at all times and slidably engaging the gripping devices.

23. In a typewriting machine, the combination of a platen shaft, a platen roll fixed thereon, a line space wheel loosely mounted on the shaft, a friction disk held to rotate with the line space wheel, a guiding and driving member held to the shaft having two oppositely disposed radial slots therein, a pair of gripping devices each having a pair of jaws adapted to grip said disk at radially spaced points and also each having a part midway its ends slidably held in one of said slots, a finger wheel shiftable longitudinally of the shaft, and a pair of resilient arms carried by the finger wheel extending through the slots in said member at all times and slidably engaging the gripping devices.

24. In a typewriting machine, the combination of a platen shaft, a platen roll fixed thereon, a line space wheel loosely mounted on the shaft, a friction disk held to rotate with the line space wheel, a guiding and driving member held to the shaft having two oppositely disposed radial slots therein, a pair of resilient arcuate gripping devices each having the ends thereof bent to form jaws for gripping said disk at radially spaced points and also each having a laterally extending lug engaging in one of the slots in said member, a finger wheel shiftable longitudinally of the shaft, and a pair of oppositely disposed resilient arms carried by the finger wheel extending longitudinally of the shaft through the slots in said member and slidably engaging the gripping devices.

25. In a typewriting machine, the combination of a platen roll, a line space wheel rotable about the axis of the roll, a circular friction drum rotatable with the wheel, a gripping device adapted to be shifted into and out of gripping relation with the curved surface of the drum, a driver rotatable with the roll, means forming a universal flexible connection between the driver and gripping device, and manually operable means shiftable endwise of the roll engaging the gripping device for shifting the same into and out of gripping relation with the drum.

26. In a typewriting machine, the combination of a platen roll, a line space wheel rotatable about the axis of the roll, a circular friction drum rotatable with the wheel, a resilient metallic gripping device, a driving member rotatable with the roll, means forming a loose rocking connection between the driving member and gripping device intermediate the ends of said device, and manually shiftable means for forcing the ends of said resilient device into engagement with the curved surface of the drum under tension.

27. In a typewriting machine, the combination of a platen, a line space wheel, means rotatable with the line space wheel having a circular gripping surface concentric with the axis of the platen, a gripping device adapted to grip said surface, a member rotatable with the platen, means forming a radially shiftable and universal rocking connection between said member and gripping device, and means shiftable longitudinally of the platen slidably engaging said device for forcing the same into gripping relation with said surface.

28. In a typewriting machine, the combination of a platen, a line space wheel, means rotatable with the line space wheel having a circular gripping surface concentric with the axis of the platen, a gripping device adapted to grip said surface, a member rotatable with the platen, means forming a radially shiftable and universal rocking connection between said member and gripping device, and a resilient member shiftable longitudinally of the platen and slidably engaging said device for forcing the same into gripping relation with said surface under pressure.

29. In a typewriting machine, the combination of a platen, a line space wheel, a clutch member rotatable with said wheel, a second clutch member rotatable with the platen and having a universal rocking connection therewith, and resilient means slidably engaging said second clutch member for forcing the same into gripping relation with the first mentioned clutch member under spring pressure.

30. In a typewriting machine, the combination of a platen shaft, a platen roll fixed thereon, a line space wheel loosely mounted on the shaft, a clutch member rotatable with the line space wheel, a second clutch member, a driving member rotatable with the shaft, means forming a universal rocking connection between the second clutch member and the driving member, a finger wheel shiftable longitudinally of the shaft, and an arm carried by the finger wheel slidably engaging the second clutch member.

31. In a typewriting machine, the combination of a platen shaft, a platen roll fixed thereon, a line space wheel loosely mounted on the shaft, a clutch member rotatable with the line space wheel, a second clutch member, a driving member rotatable with the shaft, means forming a universal rocking connection between the second clutch member and the driving member, a finger wheel shiftable longitudinally of the shaft, and a resilient arm carried by the finger wheel extending longitudinally of the shaft and slidably engaging the second clutch member at its point of connection with the driving member.

32. In a typewriting machine, the combination of a platen shaft, a finger wheel on one end of said shaft shiftable longitudinally of the shaft, a platen roll fixed on the shaft, a line space wheel loosely mounted on the shaft between said finger wheel and the adjacent end of the platen roll, a disk having a friction surface concentric with the shaft rotatable with the line space wheel and located between said wheel and the finger wheel, a pair of oppositely disposed gripping devices each having a pair of jaws adapted to grip said friction surface on the disk at radially spaced points, means held to the shaft adjacent said disk forming a driving connection between said devices and the shaft, and a pair of resilient arms extending inwardly from the finger wheel and slidably engaging said gripping devices intermediate their ends.

This specification signed this 16, day of May, A. D. 1919.

FRANK H. ARMSTRONG.